Jan. 7, 1964                FRANKLIN P. H. CHEN                3,117,003
                    TITANIUM ZIRCONIUM CONTAINING BRAZING MATERIAL
                              Filed July 8, 1958

Inventor,
Franklin P. H. Chen,
by Gilbert P. Tarleton
His Attorney.

United States Patent Office 3,117,003
Patented Jan. 7, 1964

3,117,003
TITANIUM-ZIRCONIUM CONTAINING
BRAZING MATERIAL
Franklin P. H. Chen, Pittsfield, Mass., assignor to General Electric Company, a corporation of New York
Filed July 8, 1958, Ser. No. 747,242
2 Claims. (Cl. 75—164)

The present invention relates to brazing alloys and particularly to alloy materials useful for making fluidtight ceramic-to-metal or ceramic-to-ceramic bonding seals, or for metallizing a ceramic surface prior to making such seals.

The term "ceramic" as used herein is intended to include such materials as porcelain, stoneware, whiteware, pottery, glass, quartz, carbon, silicon carbide, and other refractory, vitreous, or crystalline materials.

The brazing alloy of the present invention is of the type containing titanium or zirconium, or combinations thereof. Ceramic sealing or metallizing materials containing titanium are already known, this substance having the characteristic of wetting ceramic materials and forming an intimate bond therewith. Heretofore, titanium has generally been used in the form of its hydride for this purpose. However, prior metallizing or brazing procedures using titanium hydride or titanium in free form have been difficult to carry out due to its very high reaction temperature and have in many cases produced unsatisfactory bonds due to the oxidation effects to which these materials are readily susceptible. Attempts to overcome these difficulties have been made in the past by forming alloys of titanium or zirconium with other metals such as silver, copper, and the like. However, prior alloys of this type containing a substantial proportion of titanium have not proved satisfactory due to the brittleness and poor workability of such brazing material. Reduction in the proportion of titanium, on the other hand, to improve the ductility of the alloy resulted in insufficient titanium to provide effective wetting and bonding action. Even the addition of very ductile components such as lead, as disclosed in copending application Serial No. 457,262, Moore et al., filed September 20, 1954, now Patent 3,001,269, issued September 26, 1961, and assigned to the same assignee as the present invention, has not resulted in brazing alloys of such ductility that wire or similarly thin forms could be readily produced therefrom by ordinary procedures.

It is an object of the invention to provide a brazing material which overcomes the above disadvantages of prior types of brazing materials.

It is another object of the invention to provide a brazing alloy of the titanium or zirconium type for making fluidtight, strongly adherent, ceramic-to-metal or ceramic-to-ceramic seals, as well for metallizing ceramic surfaces, wherein the alloy is sufficiently ductile to be formed by ordinary fabricating methods into a wire, thin sheet or similarly readily shaped forms without sacrifice in the bonding effectiveness of the alloy, and to provide a method of making such a brazing alloy.

It is still another object of the invention to provide a brazing alloy of the above type which is stable under high temperature conditions and wherein the active ceramic wetting component is well distributed therethrough so as to provide a homogeneous and uniform seal structure.

With the above objects in view, the present invention relates to a brazing alloy comprising a multi-phase alloy consisting of an alloy phase composed of titanium-copper alloy or zirconium-copper alloy dispersed in the multi-phase alloy, and at least another metal phase comprising a ductile solder metal.

By virtue of incorporating the titanium in a separate phase in the brazing material in accordance with the invention, the described alloy composition provides the necessary wetting action during the brazing procedure to ensure a good bond, while at the same time containing a sufficient amount of the ductile solder material to impart a high degree of ductility to the brazing alloy.

The invention will be better understood from the following description taken in conjunction with the accompanying drawing, in which.

Figure 1:
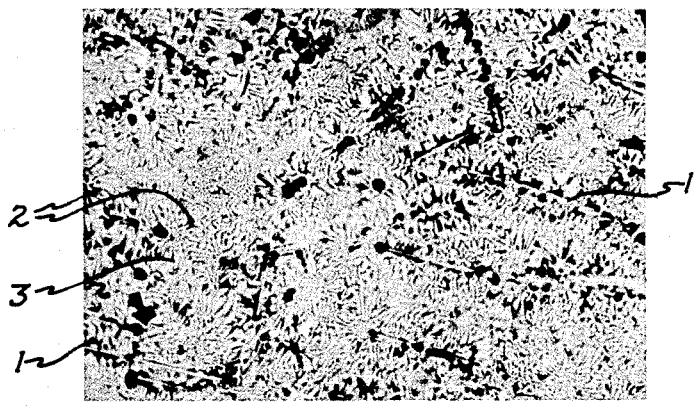
FIG. 1 is a photomicrograph at 600× magnification of a section of a brazing alloy produced in accordance with the present invention.

In accordance with the invention, a brazing alloy is produced wherein the active wetting metal, e.g., titanium, is introduced into the brazing material as a titanium-copper compound or alloy, which enters and exists therein as a separate phase, both in the brazing alloy and in the final seal formed by the alloy. While reference is made in the present description for the most part to titanium as the active wetting component, it will be understood that the same description applies equally to zirconium, which as well known in the art has similar characteristics and could, if desired, be substituted for all or part of the titanium in preparing the alloy. The titanium-copper alloy containing a substantial proportion of titanium is prepared separately, and then mixed and alloyed with another braze component composed of a ductile metal or alloy of well known types of solder metals, such as disclosed for example by United States Patent 2,570,248, Kelley. Preferably, silver, copper, zinc, cadmium or tin, or alloys thereof, are used as the ductile solder metal component of the brazing alloy. However, other metals which could be employed for this component include gold, nickel and aluminum or alloys thereof.

In the brazing procedure using the braze material of the invention to join two bodies together, at least one of which is a ceramic material, the titanium-copper phase reacts with the ceramic body to form a strong bond and fluid-tight seal between the ceramic, brazing alloy and other body when the alloy is heated to the melting temperature in a suitable atmosphere. Because the titanium is retained in relatively high concentration by virtue of its combination with copper in the titanium-copper phase up to the moment of contact with the ceramic body, it provides an effective wetting and bonding action in the sealing operation. At the same time, the presence of the titanium-copper phase in relatively uniform distribution throughout the braze alloy affords the advantage of a homogeneous and uniformly effective seal structure in the resulting brazed joint.

Referring now to the drawing, there is shown a photomicrograph at a magnification of 600× of a section of a braze alloy structure of the present invention. This alloy was prepared by mixing and melting together a titanium-copper alloy with a silver-copper alloy, the braze material having the composition corresponding to composition I in the table below. The resulting multi-phase alloy as shown in the figure includes the titanium-copper phase 1 appearing as long gray lines dispersed through the alloy structure, a copper-silver ($\beta$ copper) phase 2 appearing as minute contoured black lines, and a different copper-silver ($\alpha$ silver) phase 3 appearing as a white matrix. The copper-silver phases 2 and 3 differ principally in the relative proportions of silver to copper in the respective phases.

In the titanium-copper phase 1, the proportion of titanium may be in the range of 20–90% by weight of this phase and the copper in the range of 80–10%. Smaller amounts of titanium than the above range would provide inadequate bonding action of the alloy, whereas amounts of titanium greater than the specified range would result in excessive brittleness of the braze material and the subsequent seal structure.

In particularly preferred embodiments of the invention, the titanium-copper alloy phase contains about 65% titanium and 35% copper.

The ductile braze metal component with which the titanium-copper alloy may be combined, such as the solder metals described above, may be employed in unalloyed form, but it is usually desirable to employ alloys of such metals, for example, a silver-copper alloy, in order to obtain lower melting point materials. Examples of solder metal alloys other than silver-copper which have been found particularly satisfactory for combination with the titanium-copper alloy are silver-copper-zinc alloys, and silver-copper-zinc-cadmium alloys.

In general, the proportion of the titanium-copper compound used in preparing the braze alloy material may be in the range of 2–15% by weight of the braze alloy, with a preferred amount being about 10%.

The following are examples of compositions in percent by weight which are illustrative of the braze material of the present invention, it being understood that it is not intended to limit the scope of the invention thereby:

|  | Weight, Percent | | |
| --- | --- | --- | --- |
|  | I | II | III |
| Titanium-copper compound (65% titanium, 35% copper) | 10.0 | 10.0 | 10.0 |
| Silver | 64.8 | 54.5 | 45.0 |
| Copper | 25.2 | 22.3 | 14.0 |
| Zinc |  | 13.3 | 14.8 |
| Cadmium |  |  | 16.2 |

While in general it is preferable to form a single alloy of the ductile solder metals before combining the latter with the titanium-copper alloy, the invention is not limited to this procedure, since other methods of making the ductile solder metal component may be employed with satisfactory results.

A typical procedure for preparing and using the brazing materials of the invention is as follows, it being understood that the invention is not limited to the particular process set forth.

Using composition I of the above table, a powder of pure titanium is thoroughly mixed with the copper which is also in powder form, and the mixture melted in a graphite crucible in a dry hydrogen atmosphere in a furnace at about 900–1000° C.

The resulting titanium-copper alloy is ground to powder form and mixed thoroughly with a silver-copper alloy powder made of 72% silver and 28% copper, the amount of titanium-copper alloy incorporated therein being 10% of the total weight. This mixture is melted at about 950° C. in a hydrogen furnace, and the resulting alloy allowed to cool and solidify into a billet. This alloy billet is swaged and drawn into a wire of a diameter, for example, of 0.3 inch or less, or it may be rolled into sheet form of similar thickness.

Using the wire or sheet form, or a strip of the sheet, it is bent into desired shape to fit in the space between the parts to be joined, such as a metal and a ceramic body, and the assembly heated at about 1000° C. in a vacuum, or in a dry hydrogen or inert gas atmosphere, the sealing temperature depending upon the particular alloy composition used.

The metals which may suitably be directly bonded to ceramics by the use of the present brazing alloy should of course, be those having a melting point higher than that of the particular composition of brazing alloy used. Such metals include, but are not limited to, steel, iron, nickel, copper, and alloys thereof. For lower melting point metals such as aluminum, brass, and the like, the ceramic is preferably first metallized with the present brazing alloy and then soldered or brazed with a commercially available low temperature braze or solder, as described hereinafter.

Figures 2, 3:
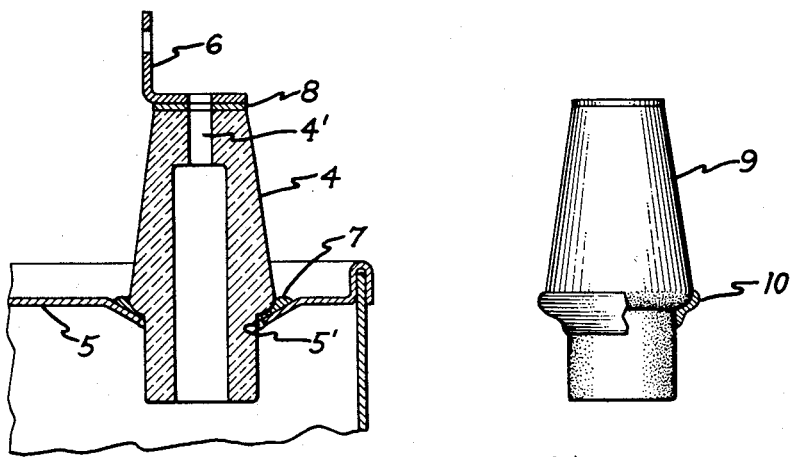
FIG. 2 is a sectional view of a ceramic insulating bushing joined to a metallic member by means of the brazing alloy of the invention.
FIG. 3 shows an insulating ceramic bushing provided with a metallizing coating of the present alloy composition.

FIGURE 2 shows a type of ceramic-to-metal joint which may be made using the present braze alloy, the arrangement shown comprising a ceramic bushing 4 inserted loosely into an aperture 5' in a metal, e.g. steel, capacitor cover 5 or the like, bushing 4 having a channel 4' through which a wire may pass to be connected to terminal 6. Bushing 4 is joined in fluid-tight relation to cover 5 by a seal joint 7 formed by the present braze alloy. In making seal 7 an annular brazing ring, e.g., of wire or strip form, composed of the brazing alloy of the invention is preferably first arranged at the junction of the bushing and cover. The thus assembled parts are placed in a furnace muffle in a non-oxidizing atmosphere, and heated to a temperature above the melting point of the alloy, but below the melting point of metal cover 5. At such temperature, the brazing ring melts, and by virtue of the action of the titanium component therein, the molten alloy flows along the adjoining surfaces of both the metal cover 5 and ceramic bushing 4 to form, when solidified, a strong hermetic ductile seal joining the bushing to the cover. The assembly may be moved into the cooling zone of the furnace immediately after melting occurs, the time for sealing and cooling depending upon the mass of the assembly.

Terminal 6, which may for example be made of copper, is similarly joined to porcelain bushing 4 by means of braze material 8 of the present alloy composition.

In other cases it may be found more convenient or otherwise desirable to initially apply the brazing alloy only to the ceramic body and metallize the latter with the brazing alloy at the fusing temperature. FIGURE 3 illustrates a ceramic bushing 9 which is provided with a metallized brazing coating 10 having a composition in accordance with the present invention. The material which forms coating 10 may be a finely-divided form of the alloy braze described herein, the powdered alloy being suspended in a fugitive vehicle to facilitate application of the alloy as a coating to the ceramic surface. Such carrier materials may include benzene, alcohol, varnish, lacquer, cellulose acetate, cellulose nitrate, and the like. The suspended alloy material is then applied initially to the bushing in any suitabe manner and heated in a non-oxidizing atmosphere above the melting point of the alloy to thereby form a metallized coating 10 on the bushing. If desired, other methods of applying the alloy on the ceramic, such as applying it on the ceramic surface in wire or sheet form, and then heating the assembly, may be employed. Thereafter, when desired, the metallized bushing 9 may be inserted into an aperture or recess of a supporting plate such as the capacitor cover shown, and with the use of low melting temperature brazing or soldering alloys of well known type, a strong, hermetic ceramic-to-metal seal may be made between the metallized ceramic bushing and the supporting plate. Such procedure also permits effective seals to be made where the supporting plate is of relatively low melting point, such as aluminum or brass.

There is thus provided by the invention a brazing alloy material which is characterized by the excellent bonding and wetting action afforded by titanium without the attendant disadvantages of brittleness often encountered in prior braze materials of this type. Moreover, the superior ductility and workability of the present material makes it possible to readily form it into a variety of shapes using conventional rolling, wire drawing or other methods which considerably facilitates its application in making seal joints of a configuration. The multi-phase alloy form of the described material with its well-distributed titanium content is particularly advantageous in making uniform and homogeneous seal structures.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An independent article of manufacture comprising a body of predetermined shape adapted to be placed and fused in situ adjacent parts to be joined together thereby, said body composed essentially of a multi-phase alloy consisting of (1) 2–15% by weight of a titanium-copper alloy phase in the range of proportions of 20–90% titanium and 80–10% copper, and (2) another phase consisting of a silver-copper alloy composed essentially of silver and copper.

2. An independent article of manufacture comprising a body of predetermined shape adapted to be placed and fused in situ adjacent parts to be joined together thereby, said body composed essentially of a multi-phase alloy consisting of (1) 2–15% by weight of an alloy phase selected from the group consisting of titanium-copper alloy and zirconium-copper alloy containing respectively 20–90% titanium and 20–90% zirconium and the remainder copper, and (2) another metal phase having said alloy phase dispersed therein and comprising a ductile solder metal selected from the group consisting of silver, copper, zinc, tin, cadmium, gold, nickel, and aluminum, and combinations and alloys thereof.

References Cited in the file of this patent

UNITED STATES PATENTS

| | | |
|---|---|---|
| 1,023,332 | Rossi | Apr. 16, 1912 |
| 1,352,322 | Stay | Sept. 7, 1920 |
| 2,195,307 | Hensel et al. | Mar. 26, 1940 |
| 2,196,302 | Hensel et al. | Apr. 9, 1940 |
| 2,362,893 | Durst | Nov. 14, 1944 |
| 2,369,350 | Hansen | Feb. 13, 1945 |
| 2,667,432 | Nolte | Jan. 26, 1954 |
| 2,728,425 | Day | Dec. 27, 1955 |
| 2,739,375 | Coxe | Mar. 27, 1956 |
| 2,746,886 | Belser | May 22, 1956 |
| 2,820,534 | Hume | Jan. 21, 1958 |

FOREIGN PATENTS

| | | |
|---|---|---|
| 559,434 | Canada | June 24, 1958 |